Nov. 1, 1949.  C. A. MAUDLIN  2,486,666
STRIP INSERTING HAND TOOL
Filed Dec. 31, 1948
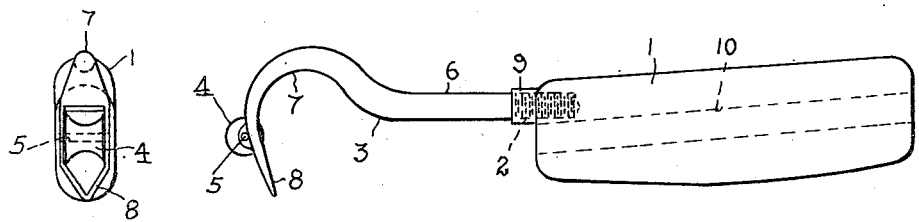
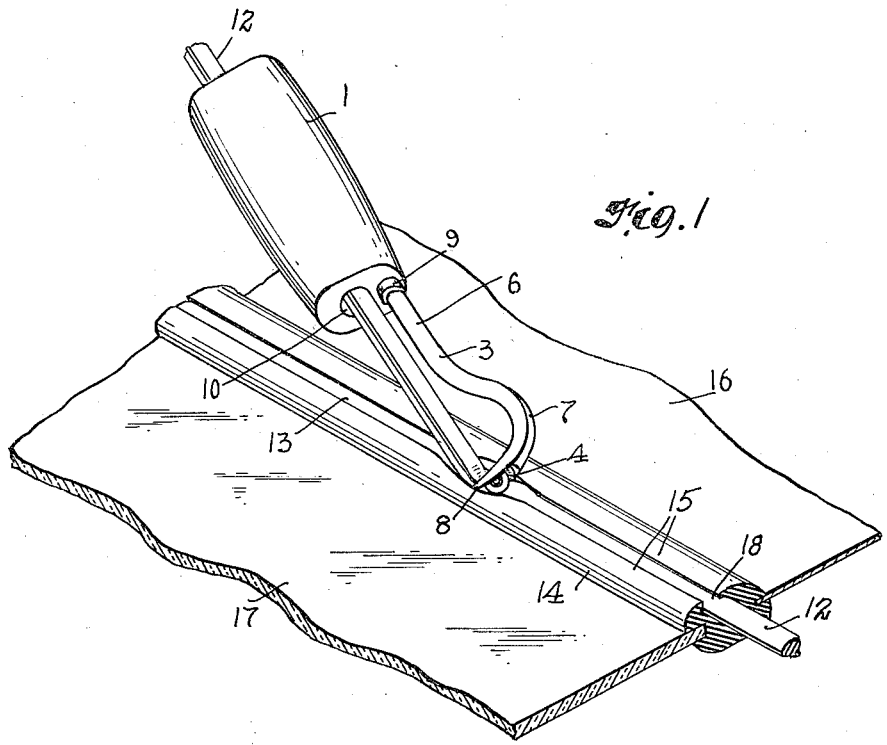
INVENTOR.
COY ANDREW MAUDLIN
BY
Oberlin & Limbach
ATTORNEYS.

Patented Nov. 1, 1949

2,486,666

UNITED STATES PATENT OFFICE 2,486,666

STRIP INSERTING HAND TOOL

Coy Andrew Maudlin, Ponca City, Okla.

Application December 31, 1948, Serial No. 68,640

1 Claim. (Cl. 29—270)

This invention relates as indicated to a novel form of a hand tool. More specifically, the invention relates to a modified strip insertion hand tool especially adapted to speed up the insertion of a rubber locking strip into a rubber weatherstrip formed to receive the same.

The term "rubber" as used herein, is intended to include all elastic materials, such as natural rubber, synthetic rubber, and the like.

The automotive industry makes considerable use of a flexible rubber weatherstrip as a weather seal between the metal body and the glass windows. The operation as now performed, consists of positioning the weather strip along the metal edge and then inserting the glass window into the upper positioning slot of the weatherstrip. In order to facilitate the operation, a longitudinal groove is cut into one portion of the weatherstrip near the locating slot for the window. Thus, as the window is being installed, the upper part of the rubber strip is pulled away from its true position, providing a free access for the glass sheet. After the window has been seated snugly all along its seat in the weatherstrip, the portion of the rubber that was forced away now returns to its original position. However, the groove cut into the rubber weatherstrip is open and the glass may be jarred loose, so there is inserted into the open groove a rubber locking insert, holding the gripping portions of the rubber weatherstrip firmly against the glass and metal body. The insertion of this rubber insert has been heretofore accomplished by hand or by tools that are difficult of operation in that considerable force is required to overcome the friction existing between the working surface of such tools and the rubber material, thus resulting in a slow and tedious operation.

It is a principal object of this invention to provide an improved tool for automatically inserting such rubber locking insert which is generally more satisfactory than any heretofore previously employed and which does not possess the disadvantages mentioned above.

Other objects will appear as the following description proceeds.

To the accomplishment of the foregoing and related ends, the invention then comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

Broadly stated this invention comprises a hand tool of the class and for substantially the purpose described, comprising a handle portion having a substantially longitudinal bore extending axially therethrough, a solid rod projecting from one end of said handle portion and terminating in a hook portion possessing a flat tapered point, said point having an eye formed therein and a rotatably mounted grooved roller positioned across said eye.

In the further explanation of my improved hand tool, it becomes convenient to illustrate by drawings, in which:

Fig. 1 is a perspective view of a preferred form of the hand tool, shown in operation.

Fig. 2 is a side elevational view of the tool.

Fig. 3 is a front end view of the improved tool.

Referring now more specifically to the drawings and more especially to Figs. 1 and 2, the hand tool shown consists of an elongated handle portion 1 which may be made from any suitable material. The hook portion 3 may be fashioned from metal and comprises the unbent part 6, the hook 7 and the flat tapered point 8. The complete hook 3 is threaded at 2, so that collar 9 may be fastened thereto, and the threaded portion also provides a means of attached to handle 1. The flat tapered point 8 has an opening 11, the lower contours of which closely approximate the lower portion of flexible rubber insert 12. Grooved roller 4 is rotatably secured to hook portion 7 through the pin 5 by conventional means. Rubber insert 12 passes through opening 11 and under grooved roller 4, so that grooved roller 4 may exert a downwardly pressure on flexible rubber insert 12. The point 8 is tapered so that when it is run through slot or groove 13 of rubber weatherstrip 14, the slot or groove 13 is opened sufficiently to allow rubber insert 12 to fit in easily, with the rubber lips 15 closing over insert 12 after the point 8 is moved further down slot 13. Handle portion 1 has a substantially longitudinal axial hole or bore through it, running in line with the lower portion of opening 11, so that the rubber insert 12 runs through handle 1 in hole or bore 10, then directly to opening 11 under roller 4.

In the practical operation of my invention, flexible rubber weatherstrip 14 is inserted between the metal body portion 16 and window glass portion 17. The improved hand tool is made ready for use by inserting the flexible rubber locking strip 12 into guide hole 10 and then through opening 11 under roller 4. The tool is held with flat tapered point 8 down into groove or slot 13 so that point 8 and roller 4 are in a line substantially parallel to the slot or groove 13 with the lips or edges of slot 13 set apart ready to receive rubber locking strip 12. The free end of rubber locking strip 12 just in front of point 8 is tucked into slot or groove 13 at point 18. Pressure is applied to the hand tool 1 in a downwardly direction and the tool 1 is moved along slot or groove 13 away from starting point 18. The point of pressure action is between roller 4 and the top portion of rubber locking strip 13, resulting in a free and unretarded movement regardless of how much pressure is applied to seat the rubber locking strip 12. It should be noted at this point, that when using the conventional tools, increased pressure applied to insert rubber insert 12 results in increased friction between the metal parts of the tools and the rubber material, this being due in part to the restricted angle in which the tools may be used or held.

The novel structure of my improved hand tool permits such hand tool to be held in any angle up to approximately 90°, thus the rubber locking strip 12 is seated more satisfactorily and rapidly due to the substantial elimination of friction.

In one simple operation, groove or slot 13 is opened to receive rubber insert 12, and then closed over insert 12 to yieldably retain such insert in position, and weatherstrip 14 firmly held against window glass 17 and metal body 16.

Other modes of applying the principle of the invention may be employed, change being made as regards the details described, provided the features stated in the following claim, or the equivalent of such, may be employed.

I therefore particularly point out and distinctly claim as my invention:

A hand tool comprising a somewhat round elongated handle portion having a substantially longitudinal bore extending axially therethrough and adapted to receive and guide a continuous rubber insert, a solid rod projecting axially from said handle portion anchored at one end thereof by means of external threading on said rod end and having a collar attached thereto flush at the anchored end of said rod, said rod terminating in a hook portion possessing a flat tapered point, said point having an eye formed therein the lower portion of which roughly approximates the contour of such insert, and a rotatably mounted grooved roller positioned across the center of said eye.

COY ANDREW MAUDLIN.

REFERENCES CITED

The following references are of record in the file of this patent:

UNITED STATES PATENTS

| Number | Name | Date |
|---|---|---|
| 1,496,239 | Lynch | June 3, 1924 |
| 1,615,073 | Deal | Jan. 18, 1927 |
| 1,875,728 | Henry | Sept 6, 1932 |
| 1,879,440 | Olson | Sept. 27, 1932 |
| 2,189,138 | Eichner | Feb. 6, 1940 |